United States Patent Office 2,725,377
Patented Nov. 29, 1955

2,725,377

ICE COLORS OF THE AZOLE SERIES

Frederick Brody, New York, N. Y., and Robert S. Long, Bound Brook, N. J., assignors to American Cyanamid Company, New York, N. Y., a corporation of Maine No Drawing. Original application March 1, 1952, Serial No. 274,490, now Patent No. 2,695,298, dated November 23, 1954. Divided and this application January 14, 1954, Serial No. 404,127

7 Claims. (Cl. 260—157)

This invention relates to compounds of the formula,

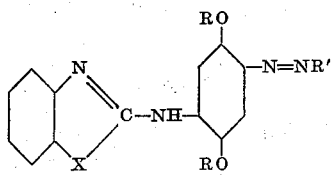

in which X is selected from the group of O and S, R is lower alkyl, and R' is the residue of an ice-color coupling component.

The production of azoic coloring matters of a greenish shade of blue and satisfactory fastness properties has been a considerable problem. Such coloring matters are rare and have been both expensive and frequently possessed disadvantageous properties. We have found that azoic coloring matters in which R' in the above formula is the residue of an arylide of 2-hydroxy-3-naphthoic acid are blue azoic coloring matters of very rare greenish shade and have good fastness properties. These constitute the preferred embodiment of the present invention which, however, is not limited thereto as a wide range of other shades are obtained when different coupling components are used.

The intermediate amines which are diazotized to form the diazo components of the coloring matters of the present invention, that is to say, compounds having the formula,

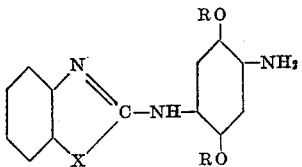

in which X is selected from the group of O and S, and R is lower alkyl, are in themselves new compounds. They are, however, not claimed in the present application forming the subject matter of a parent case, Serial No. 274,490, filed March 1, 1952, now Patent No. 2,695,298 of which the present application is a division.

It is an advantage of the present invention that the amines diazotize smoothly and couple readily with ice-color coupling components, such as beta-naphthol, 8-amino-2 - naphthol, 8 - acetylamino - 2 - naphthol, benzyl naphthols, pyrazolones, hydroxybenzofluorenones and the various N-substituted amides such as arylides of 2-hydroxy-3-naphthoic acid, 2-hydroxy-3-anthroic acid, of methyl and dimethyl-salicyclic acids, of hydroxybenzacridone carboxylic acids, of hydroxybenzofuran carboxylic acids, of hydroxybenzothiophene carboxylic acids, of acetoacetic acid, of benzoylacetic acid and the like.

This invention is further illustrated by the following examples. Where not otherwise noted, parts are by weight.

Example 1

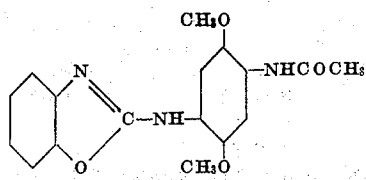

A mixture of 2.1 parts of 2,5-dimethoxy-4-aminoacetanilide, 3.07 parts of 2-chlorobenzoxazole and 2 parts of N hydrochloric acid in 50 parts of 50% dioxane-water is refluxed. Condensation is rapid. The mixture is then cooled, drowned and filtered. The product may be crystallized from ethanol.

Example 2

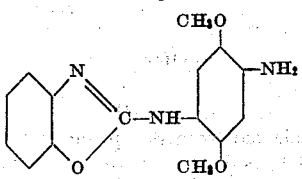

A mixture of 8.0 parts of the product of Example 1 and 120 parts of concentrated hydrochloric acid in 200 parts of ethanol is refluxed briefly, drowned, made alkaline with ammonia and filtered. The product may be recrystallized from ethanol. Too long refluxing should be avoided, since it tends to cause rupture of the oxazole ring with formation of 2,5-dimethoxy-p-phenylenediamine.

Example 3

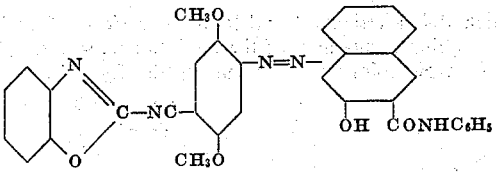

The base of Example 2 is diazotized in the ordinary way with sodium nitrite and hydrochloric acid and when coupled with 2-hydroxy-3-naphthoic anilide in the usual way gives a blue dye.

Example 4

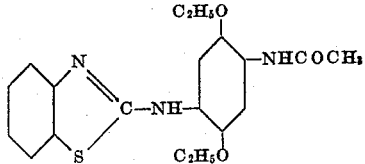

A mixture of 17.0 parts of 2-chlorobenzothiazole, 23.8 parts of 2,5-diethoxy-4-aminoacetanilide and 10 parts of N hydrochloric acid in 250 parts of 50% dioxane-water is refluxed until condensation is complete. The mixture is then cooled, drowned in 500 parts of water and filtered. A good yield of product is obtained.

Example 5

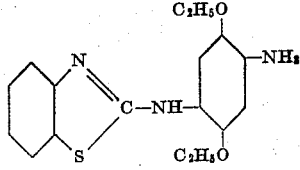

A mixture of 3.71 parts of the product of Example 4 with 12 parts of concentrated hydrochloric acid and 20 parts of ethanol is refluxed until hydrolysis is complete, drowned in 125 parts of water and then made alkaline with sodium hydroxide. On filtration, an excellent yield of product is obtained, which may be recrystallized from ethanol.

*Example 6*

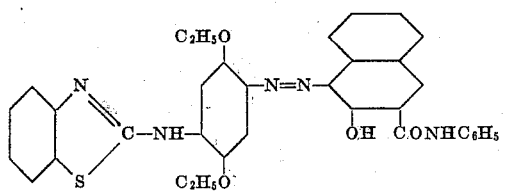

The product of Example 5 is diazotized in the normal way and when coupled with 2-hydroxy-3-naphthoic anilide gives a blue dye of extremely greenish shade and good fastness properties.

We claim:

1. Azoic coloring matters of the formula:

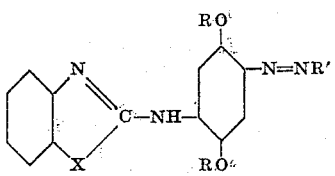

in which X is selected from the group of O and S, R is lower alkyl, and R' is the residue of an ice-color coupling component of the naphthalene series.

2. An azoic coloring matter having the formula

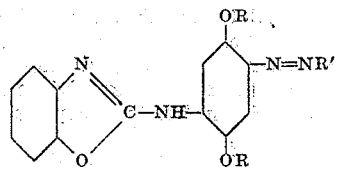

in which R is lower alkyl and R' is the residue of an ice color coupling component of the naphthalene series.

3. An azoic coloring matter having the formula

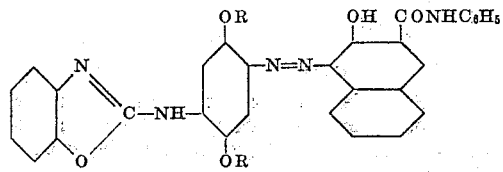

in which R is lower alkyl.

4. An azoic coloring matter having the formula

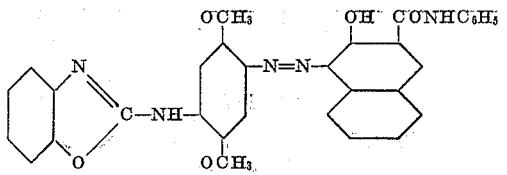

5. An azoic coloring matter having the formula

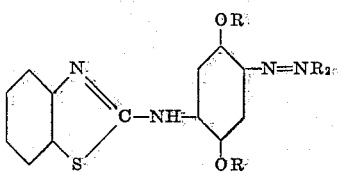

in which R is lower alkyl and $R_2$ is the residue of an ice color coupling component of the naphthalene series.

6. An azoic coloring matter having the formula

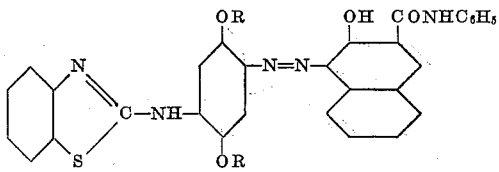

in which R is lower alkyl.

7. An azoic coloring matter having the formula

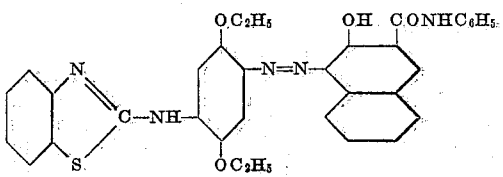

No references cited.